United States Patent [19]

Yealy

[11] Patent Number: 4,511,417
[45] Date of Patent: Apr. 16, 1985

[54] CABLE REEL WITH REINFORCING FLANGES

[75] Inventor: Carl F. Yealy, New Oxford, Pa.

[73] Assignee: Merline Industries, Inc., Hanover, Pa.

[21] Appl. No.: 528,166

[22] Filed: Aug. 31, 1983

[51] Int. Cl.³ .................. B29C 27/08; B65H 75/14
[52] U.S. Cl. ............................. 156/73.5; 156/294; 242/118.8
[58] Field of Search ............ 242/118.4, 118.61, 118.7, 242/118.8, 71.8, 68.5, 68.6; 156/73.5, 294

[56] References Cited

U.S. PATENT DOCUMENTS

| | | | |
|---|---|---|---|
| 2,190,085 | 2/1940 | Scholl | 242/118.4 |
| 2,212,377 | 8/1940 | Olson et al. | 242/118.8 |
| 2,314,749 | 3/1943 | Willner | 242/118.61 |
| 2,334,874 | 11/1943 | Howsam | 242/118.8 |
| 3,501,110 | 3/1970 | Hopgood et al. | 242/118.7 |
| 3,980,248 | 9/1976 | Minoshima | 242/118.7 |

Primary Examiner—Stephen Marcus
Assistant Examiner—Leo J. Peters
Attorney, Agent, or Firm—Stevens, Davis, Miller & Mosher

[57] ABSTRACT

A method of assembling a cardboard reel with a reinforcing plastic axis, comprising the steps of: securing a first plastic flange to the end of a hollow plastic axis by spinwelding; passing the free end of the axis through cardboard end plates and a hollow core, that form a reel; and spin welding a second flange to the end of the axis.

1 Claim, 2 Drawing Figures

CABLE REEL WITH REINFORCING FLANGES

This invention relates to reels for storage of cable or rope and in particular reels with end plates which are secured to a central hollow core by means of glueing or other adhesives.

BACKGROUND OF THE INVENTION

It is known in the prior art to form a cable reel by means of securing end plates, usually of circular configuration, to a hollow central core. For small reels or reels designed for storage of lightweight material, the central core is often of a laminated paper stock material cylindrically wound and of heavy weight. The end plates are often of heavy weight corregated cardboard material which are secured to the annular end surfaces of a hollow core by means of compatible adhesives, including epoxy materials.

The end plates are often composed of two layers of material, the outer layer being in the form of a circle having a relatively small hole at its center and the inner layer having a relatively large opening, just slightly larger than the outer diameter of the central core to which the end plate will be secured. Thus, when these inner and outer layers are securely fastened together, the inner surface of each end plate has a center depressed circular area which will receive the central core of the reel to be assembled and furnish two surfaces for adhesive securing. That is, one surface on the annular end surface of the hollow central core and the other surface on the inner circular surface defined by the opening in the inner layer.

Despite the fact that two glueing surfaces are available in the known reels, it is still a common problem for the end plates to become separated from the central core, due to rough handling and tearing of the cardboard material.

SUMMARY OF THE INVENTION

It is an object of the present invention to form a reel having end plates which are much more strongly secured to the central core of the reel by use of a reinforcing means in the form of a cylindrical member of plastics material extending along the axis of the reel and having a flange secured to each end of that central member, those flanges being positioned tightly against the outer surface of each end plate so as to reinforce the reel structure and make it considerably stronger than reels known in the prior art.

It is a further object of this invention to teach a method of assembling such a reel without the necessity of any noxious odors or vapors caused by the use of volatile solvents used to fasten plastic materials together.

These and other objects of the invention will become apparent from the following description, which is given by way of example only with illustration of a preferred embodiment as shown in the attached drawings.

DETAILED DESCRIPTION OF A PREFERRED EMBODIMENT

Figure 1:
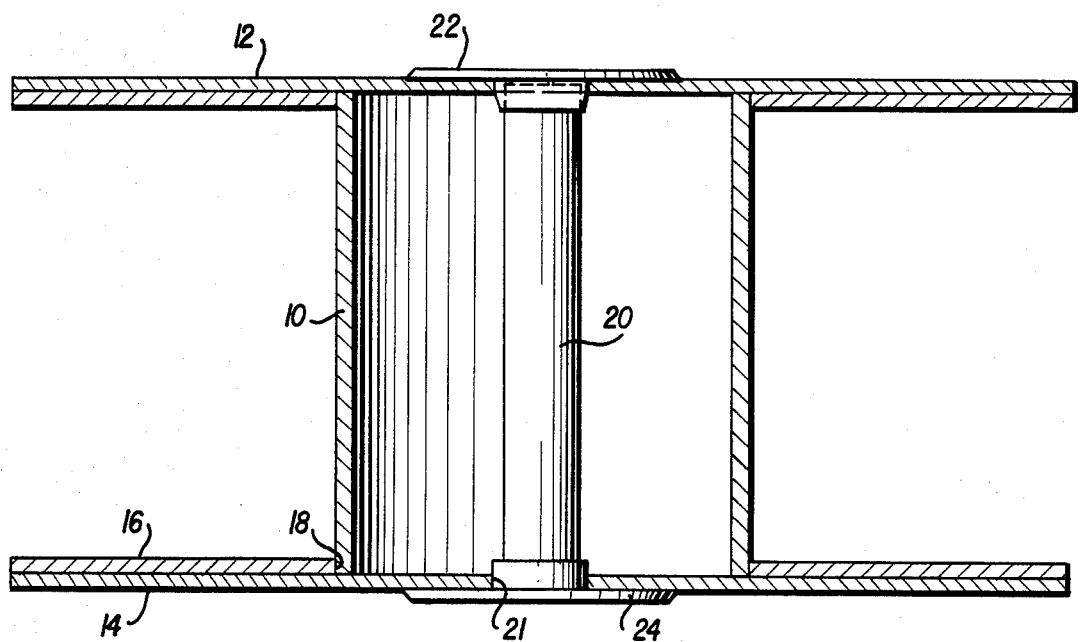
FIG. 1 is a sectional view through a reel, showing end plates held to a hollow central core and reinforced by means of external flanges.

FIG. 1 is a sectional view taken through a reel of the present invention, the section being cut approximately through and parallel to the central axis thereof. A hollow core, preferably of helically or convolutedly wound craft paper material is positioned between first end plate 12 and second end plate 14. Each end plate 12 and 14 has an outer layer of corregated cardboard and a second (inner) layer 16 which is adhesively secured to the inner surface of the outer layer. That inner layer has a circular opening of approximately the same size as the outer diameter of hollow core 10. The edge of the circular opening thus forms inner facing offset 18 and bears against the outer surface of the hollow core 10 and centers it in relation to end plates 12 and 14. Such a reel is known in the prior art and glue or other adhesive is used along offset 18 and on the annular end of core 10 to hold the reel together. As previously mentioned, such securing has not proved satisfactory in the prior art and such reels have been known to come apart through rough handling or due to dampness which affects the paper stock. In heavier reels, the core and end plates may be made of other materials, such as wood or plastics, but the same sort of problem of separation of the end plates from the central core still may be present.

Figure 2:
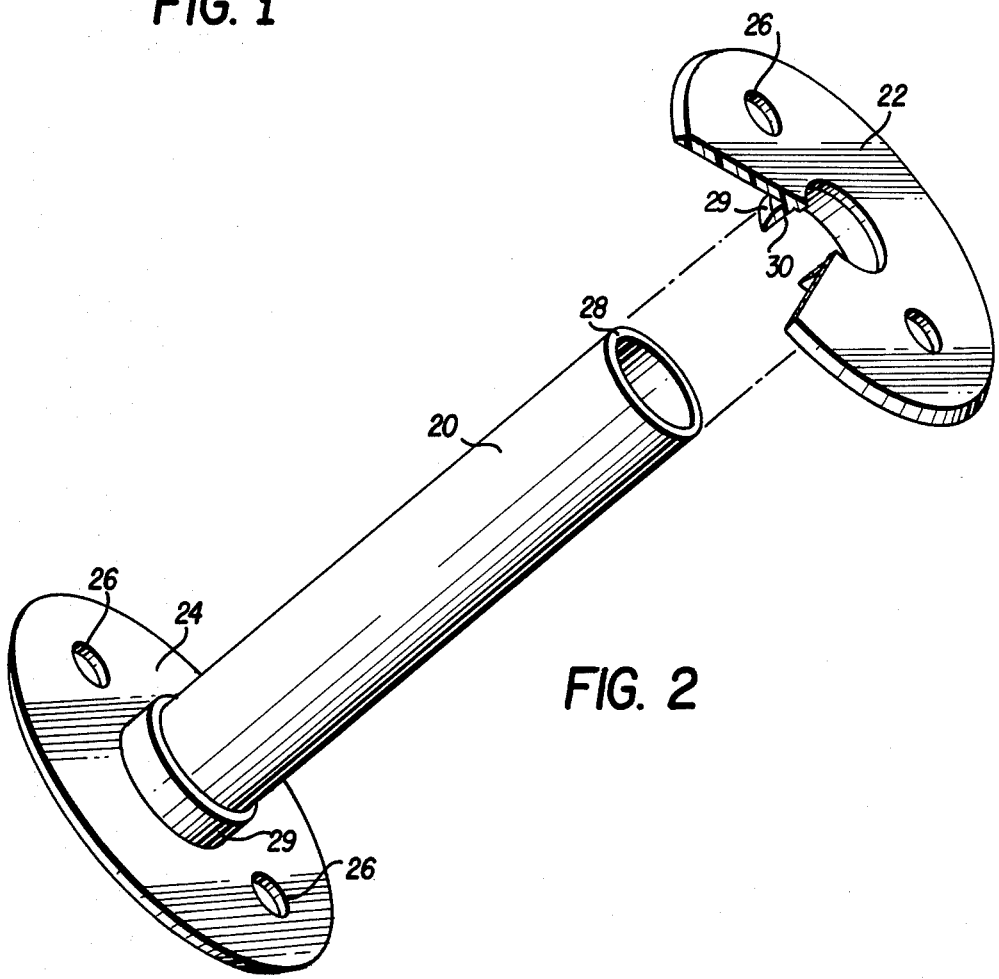
FIG. 2 is an exploded view, partly in section, showing the central reinforcement cylindrical member and the flanges associated therewith.

FIG. 2 shows a cylindrical member 20, preferably in the form of a piece of pipe of plastics material, having a first flange 22 and a second flange 24. Each of these flanges has a boss 29 having an inner opening 30, which is of a size to form an interference fit with the outer diameter of the cylindrical member 20. By "interference fit", it is meant that the cylindrical member 20 will fit into the hole 30, but only with some difficulty and the fit is so tight that when the flange is rotated in relation to the cylindrical member, there will be enough heat of friction generated to melt the plastics materials so that they fuse and become permanently fastened together. Thus, a very strong joint can be formed without the necessity of using an adhesive or a solvent, both of which would cause extra expense and expose workers to potentially noxious fumes and vapors.

The method of assembly involves securing flange 24 to one end of cylindrical member 20, preferably by holding member 20 in a stationary position in a jig and pressing flange 24 over the end of member 20, and then, by means of a tool which fits into holes 26 in the flange, rotating the flange 24 so that it becomes spin-welded to the end of member 20.

As a separate step, a cable reel is assembled in the usual manner, that is by placing end plates 12 and 14 over the ends of a hollow core 10 so that holes 21 in the center of each end plate 12 or 14 are in alignment along the axis of the reel. The holes 21 are of a size to receive the outer surface of boss 29 of flange 22 or 24. The free end 28 of member 20 is then passed through one of the holes 21, through the hollow center of core 10 and through hole 21 in the other end plate 12. Member 20 has been cut to a length so it will be approximately flush with the outer surface of flange 12 when it is installed in place with boss 29 of flange 24, projecting into the hole of flange 14. Flange 24 is then held in a jig and flange 22 is pressed against the free end 28 of member 20 so that free end 28 enters and bottoms into hole 30, which, as previously described, is sized to be of an interference fit. Flange 22 is then rotated by means of a tool which will fit in its holes 26, the rotation causing frictional heating to take place in the interference fit joint and thus melting and fusing the plastics material of flange 22 to the plastics material of the member 20, without the necessity of using any adhesives or solvents. The tool continues to press against the end of the flange until the plastic is fused.

Since the cylindrical member 20 is cut to a length which is approximately equal to the width of the reel, when flange 22 is pressed and spin-welded into place, the inner surfaces of flanges 22 and 24 will bear tightly against the outer surfaces of end plates 12 and 14, respectively, thus forming an extremely tight and rigid reel structure.

In a particular preferred embodiment, end plates 12 and 14 are made of corregated boxboard material of a diameter of about 14 inches, the core 10 is made of helically wound heavy craft paper material of a diameter of about 5 inches, and the core is about 6 inches long. The cylindrical member 20 and the flanges 22 and 24 are made of high impact polystyrene material, with the flanges each having a diameter of about 3¾ inches. The cylindrical member is a hollow pipe with an outer diameter of about 1 inch. Each boss 29 has an outer diameter of 1¼ inches and is chamfered toward its end. The outer periphery of the flanges 22 and 24 are also chamfered for a smooth finish. Spin-welding of the flange to the cylindrical member only required less than ten rotations, while the reel was held with the cylindrical member extending in the vertical position. In building this particular embodiment, the second flange was pressed onto the end of the cylindrical member 20 to bottom out in the interference fit hole 30, the flange was then rotated at 1200 RPM's for 4/10 second and the pressing was continued for an additional 4/10 second to fuse the plastics together. The time and spinning speed would vary depending upon the size of the reel and the plastics material being used. Other plastics could be spin-welded, such as polypropylene, polyethylene, polyvinylchloride and ABS, etc. If the reel is intended for use in damp locations, the corregated boxboard may be treated with wax or plastic coating to avoid water absorption.

Although a specific preferred embodiment has been disclosed, it is understood that this is only by way of example and that the scope of this invention is defined by the claims which follow.

I claim:

1. A method of assembling a reel for storage of rope or cable, said reel having a hollow central core, a pair of end plates and a cylindrical reinforcing member of plastics material, with a pair of flanges of plastics material secured to said cylindrical member and bearing on the outer surfaces of the end plates, said method comprising:

securing a first flange to one end of a cylindrical member;

assembling a pair of end plates, each having a center opening, to a central hollow core member to form a reel;

passing the free end of said cylindrical member through the center openings of said end plates and said hollow core;

placing a second flange with a hole having an interference fit on the free end of said cylindrical member;

spin-welding the second flange to the cylindrical member by pressing the second flange onto the cylindrical member and causing relative rotation between said interference fit hole of the second flange and the cylindrical member so that heat generated by said rotation causes the plastics material of the second flange and the cylindrical member to fuse together.

* * * * *